(12) United States Patent
Miyamoto et al.

(10) Patent No.: US 9,349,501 B2
(45) Date of Patent: May 24, 2016

(54) GAS INSULATED SWITCHGEAR AND MANUFACTURING METHOD OF THE SAME

(75) Inventors: Takashi Miyamoto, Tokyo (JP); Yuko Sawada, Tokyo (JP); Yukio Ozaki, Tokyo (JP); Hitoshi Sadakuni, Tokyo (JP); Shohei Sasayama, Tokyo (JP); Kazuki Kubo, Tokyo (JP); Tatsuya Okawa, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 20 days.

(21) Appl. No.: 14/367,990

(22) PCT Filed: Jul. 26, 2012

(86) PCT No.: PCT/JP2012/068961
§ 371 (c)(1),
(2), (4) Date: Jun. 23, 2014

(87) PCT Pub. No.: WO2013/121604
PCT Pub. Date: Aug. 22, 2013

(65) Prior Publication Data
US 2014/0346143 A1    Nov. 27, 2014

(30) Foreign Application Priority Data
Feb. 14, 2012   (JP) ................................ 2012-029070

(51) Int. Cl.
*H01H 33/64*    (2006.01)
*H01B 3/56*    (2006.01)
*C09D 163/00*    (2006.01)
*H01B 3/40*    (2006.01)
*H02G 5/06*    (2006.01)

(52) U.S. Cl.
CPC .............. *H01B 3/56* (2013.01); *C09D 163/00* (2013.01); *H01B 3/40* (2013.01); *H01H 33/64* (2013.01); *H02G 5/068* (2013.01); *Y10T 29/49105* (2015.01)

(58) Field of Classification Search
CPC ... H01H 33/62; H01H 1/64; H01H 2009/566; H01H 2033/028
See application file for complete search history.

(56) References Cited

U.S. PATENT DOCUMENTS 3,903,387 A * 9/1975 Sasaki .................... H01H 33/02
                                                     218/45
7,990,687 B2 * 8/2011 Yoshimura ......... H02B 13/0356
                                                     174/14 R
(Continued)

FOREIGN PATENT DOCUMENTS

JP          9-23519          1/1997
JP          4373850         11/2009

OTHER PUBLICATIONS

International Search Report issued Nov. 6, 2012, in PCT/JP2012/068961, filed Jul. 26, 2012.

*Primary Examiner* — Truc Nguyen
(74) *Attorney, Agent, or Firm* — Oblon, McClelland, Maier & Neustadt, L.L.P.

(57) ABSTRACT

A gas insulated switchgear includes a high-voltage conductor installed inside a ground tank filled with an insulation gas and the high-voltage conductor is supported on an insulation spacer and thereby fixed to the ground tank. The gas insulator switchgear is configured in such a manner that an insulation portion of the insulation spacer in contact with the insulation gas is covered with a cover film formed by hardening powder of any of thermoplastic resin, glass, cellulose, and polymer resin made of carbon and hydrogen having a particle size of 100 μm or less with epoxy resin.

13 Claims, 12 Drawing Sheets

(56) References Cited

U.S. PATENT DOCUMENTS

| | | | | |
|---|---|---|---|---|
| 8,284,002 B2 * | 10/2012 | Heller | | H01H 33/666 218/140 |
| 9,208,966 B2 * | 12/2015 | Sugiyama | | H01H 33/143 |
| 2015/0084722 A1 * | 3/2015 | Sugiyama | | H01H 33/143 335/154 |

* cited by examiner

GAS INSULATED SWITCHGEAR AND MANUFACTURING METHOD OF THE SAME

TECHNICAL FIELD

The present invention relates to a gas insulated switchgear in which a high-voltage conductor is installed so as to be insulated and supported inside a cylindrical ground tank filled with an insulation gas and to a manufacturing method of the same.

BACKGROUND ART

A gas insulated switchgear uses an $SF_6$ gas having superior insulation performance as an insulation medium, the use of which, however, is being reduced because of its global warming potential about 24000 times as high as that of carbon dioxide. Nitrogen, carbon dioxide, and dry air are used as an alternative gas. However, these gases are inferior to an $SF_6$ gas in insulation performance.

In a case where metal foreign matter in the order of several mm is present in the gas insulated switchgear, the metal foreign matter is likely to adhere to a surface of an insulation structural member and it is known that insulation performance is deteriorated considerably by adhesion of metal foreign matter. When the alternative gas specified above is used as an insulation gas, a degree of deterioration is worsened. Various methods have been proposed as a countermeasure against metal foreign matter, such as installation of a metal foreign matter trapping device at a bottom of the ground tank. It is, however, difficult to achieve 100% trapping performance. Hence, it is necessary to design the insulation structural member to withstand a lightning waveform voltage and a switching surge voltage as a test voltage even when these voltages are applied while metal foreign matter adheres to the insulation structural member.

In view of the background as above, there is a technique of enhancing insulation performance of an insulation structural member (insulation spacer) in a gas insulated device in the related art. For example, there is disclosed a technique for an electrical device having an insulator for which a voltage may possibly be applied along a surface thereof. According to this technique, a cover portion made of an ablation material that generates a gas when heated is formed on the surface of the insulator (for example, see PTL 1).

CITATION LIST

Patent Literature

PTL 1: Japanese Patent No. 4373850

SUMMARY OF INVENTION

Technical Problem

In the gas insulated switchgear in the related art, an insulator, which is thermoplastic resin, to cover an insulation spacer of a gas insulated bus has a high melting temperature and is not worked readily. Also, because thermoplastic resin has poor adhesiveness with epoxy resin, which is a material of generally used insulation spacers, an interface that becomes electrical and mechanical drawbacks may possibly be generated between the insulation spacer and the thermoplastic resin. Further, discharge energy high enough for a creepage breakdown to occur is required to use an ablation ability of the material used for the insulation spacer surface. Hence, because a creepage breakdown is a prerequisite, it is apparent that the ablation ability is not exerted with partial discharge energy generated when metal foreign matter adheres to the insulation spacer.

The invention was devised to solve the problems discussed as above and has an object to obtain a highly-reliable gas insulated switchgear capable of suppressing the occurrence of discharge even when metal foreign matter adheres to a surface of an insulation portion of an insulation spacer and a manufacturing method thereof.

Solution to Problem

A gas insulated switchgear of the invention includes a ground tank filled with an insulation gas, a high-voltage conductor installed in a center portion inside the ground tank, and an insulation spacer installed inside the ground tank and supporting the high-voltage conductor, and is characterized in that a surface of the insulation spacer is covered with a cover film formed by hardening powder made of an ablation material that generates a gas when heated with epoxy resin, and that the powder comes out to an outermost layer of the cover film.

A manufacturing method of a gas insulated switchgear of the invention is a manufacturing method of a gas insulated switchgear including a high-voltage conductor installed inside a ground tank filled with an insulation gas and supported on an insulation spacer, including a step of obtaining a mixed coating material by mixing powder of any of thermoplastic resin, glass, cellulose, and polymer resin containing carbon and hydrogen with epoxy resin, and a step of obtaining a cover film formed of the powder hardened with the epoxy resin by applying the mixed coating material on a surface of the insulation spacer followed by allowing the epoxy resin to cure, and the epoxy resin is scraped off a surface of the cover film by applying blasting to the cover film to let the powder come out to an outermost layer of the cover film.

Advantageous Effects of Invention

According to the gas insulated switchgear of the invention, energy of partial discharge is absorbed by melting, evaporating, or cutting the powder having an ablation characteristic and coming out to the outermost layer of the cover film. Hence, development of discharge can be suppressed and therefore reliability of the gas insulated switchgear can be enhanced.

According to the manufacturing method of a gas insulated switchgear of the invention, the cover film made of the powder hardened with the epoxy resin can be formed on the surface of the insulation spacer. Hence, development of discharge can be suppressed by the ablation characteristic of the powder and therefore a highly-reliable gas insulated switchgear can be obtained.

The foregoing and other objects, features, aspects, and advantages of the present invention will become more apparent from the following detailed description of the present invention when taken in conjunction with the accompanying drawings.

DESCRIPTION OF EMBODIMENTS

First Embodiment

Figure 1A:
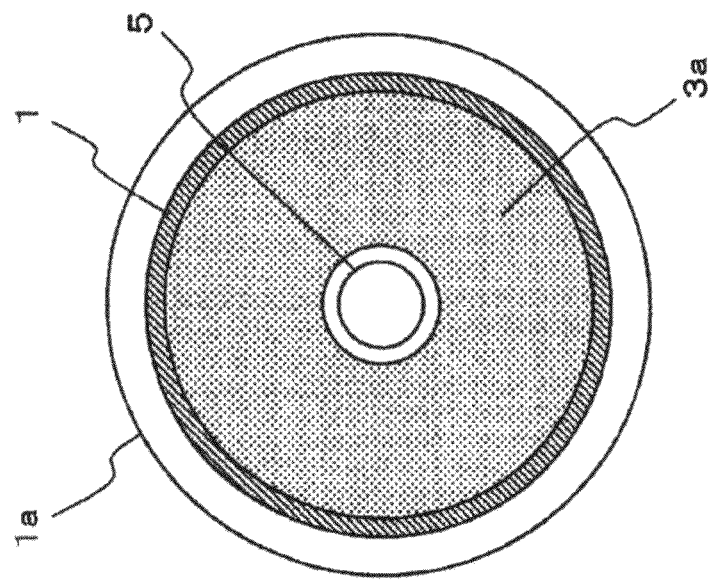
FIGS. 1A and 1B are cross sections of a portion of an insulation spacer in a gas insulated switchgear according to a first embodiment of the invention.
Figure 1B:
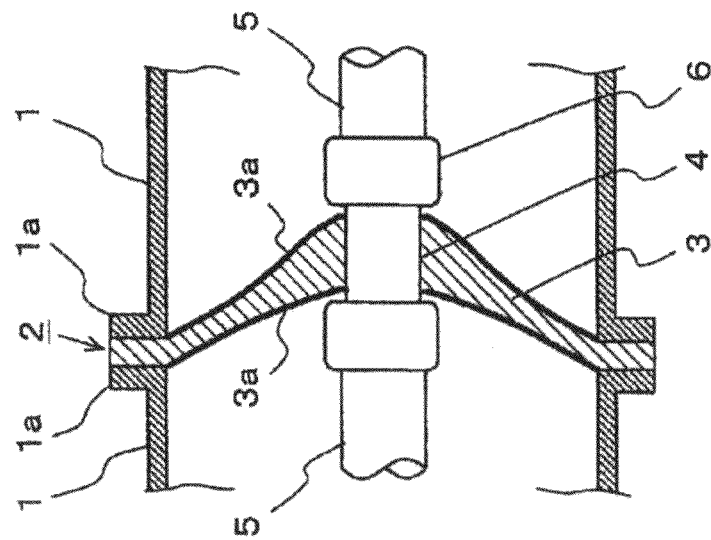
Figure 2:
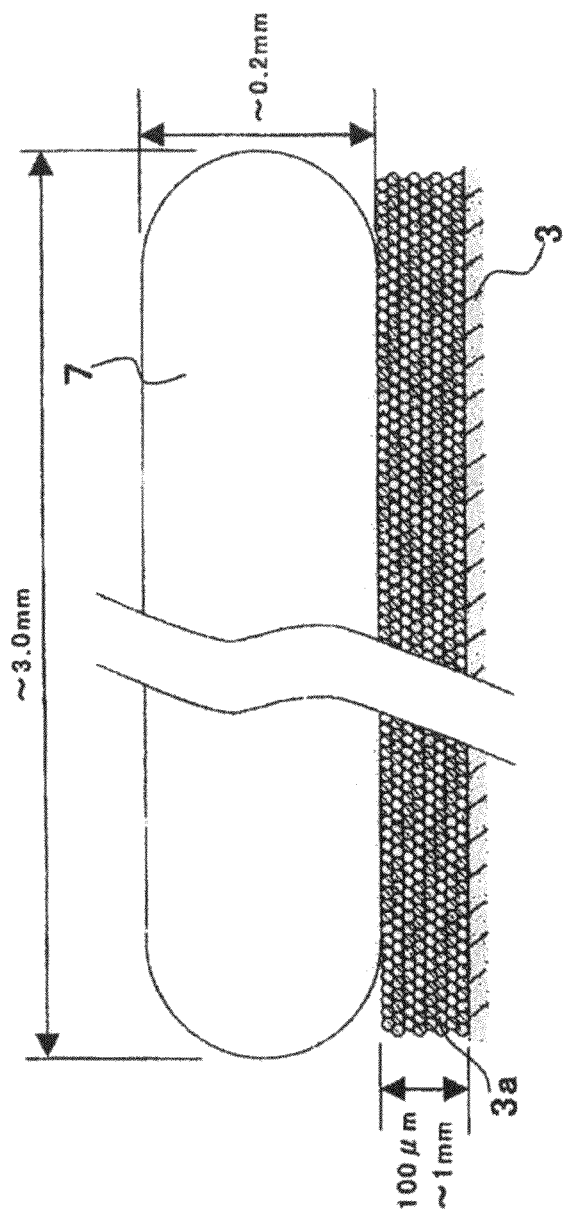
FIG. 2 is an enlarged cross section showing a state in which metal foreign matter adheres onto an insulation portion of the insulation spacer of FIG. 1.

FIG. 1 is a view showing a portion of an insulation spacer in a gas insulated switchgear according to a first embodiment of the invention. FIG. 1A is a sectional side view and FIG. 1B is a front view of the portion of the insulation spacer when viewed from an axial direction of a tank. Also, FIG. 2 is an enlarged cross section of a surface of the insulation spacer of FIG. 1 to show a state in which metal foreign matter adheres to the surface.

Firstly, the gas insulated switchgear will be described schematically with reference to FIG. 1.

Ground tanks 1 of a predetermined length each formed of a cylindrical metal container are connected in portions of flanges 1a at respective ends with unillustrated bolts or the like. An insulation spacer 2 shaped like a conical surface (side surface portion of a cone), which is an insulation structural member, is sandwiched between connection surfaces of the flanges 1a and fixed by being bolted together with the flanges 1a. The insulation spacer 2 has an insulation portion 3 made of an insulation material and a center conductor 4 provided in a center portion. The high-voltage conductors 5 are connected to the center portion 4 from the both sides and thereby supported on the insulation spacer 2.

Given that a cone is a shape defined by a bottom surface and a side surface, the bottom surface is of a circular shape and the side surface is of a conical surface. Hence, the insulation portion 3 of FIG. 1 is of substantially a conical surface shape.

It goes without saying that the insulation portion 3 has a predetermined thickness as a chief component of the insulation spacer 2.

As a material of the insulation portion 3 forming the insulation spacer 2, for example, any of epoxy, epoxy and alumina, epoxy and silica, and epoxy and alumina fluoride is used.

Connection portions of the flanges 1a and the insulation spacer 2 are connected while maintaining airtightness and the interior of the ground tank 1 is filled with an insulation gas.

A field limiting shield 6 is provided to a connection portion of the high-voltage conductors 5 and the center conductor 4 of the insulation spacer 2.

Unillustrated system breaker, disconnection switch, and ground switch are electrically connected to the high-voltage conductor 5, and the gas insulated switchgear is formed of equipment including these devices.

The invention is characterized by a configuration of the surface of the insulation portion 3 of the insulation spacer 2. A surface shape of the insulation portion 3 will now be described.

Referring to FIG. 1, a cover film 3a is formed on the insulation portion 3 across a surface thereof in contact with the insulation gas. More specifically, the cover film (insulation portion cover film) 3a indicated by a thick line in FIG. 1A is formed of a layer obtained by mixing powder of any of thermoplastic resin, glass, cellulose, and polymer resin made of carbon and hydrogen, all of which are an ablation material having an ablation characteristic of generating a gas when heated, with epoxy resin. Examples of resin that is thermoplastic resin and also polymer resin made of carbon and hydrogen include, but not limited to polyamide resin (nylon 6, nylon 46, nylon 66, nylon 6.10, nylon 11, and nylon 12, hereinafter referred to collectively as nylon) and PMMA (Polymethyl Methacrylate or acrylic resin).

FIG. 2 is an enlarged cross section showing a state in which metal foreign matter 7 adheres onto the insulation portion 3 of the insulation spacer 2 of FIG. 1, and this drawing is a cross section of the cover film 3a in a larger scale. As is shown in the drawing, the cover film 3a is made of powder 31 of any of thermoplastic resin, glass, cellulose, and polymer resin made of carbon and hydrogen, and epoxy resin 32. The powder 31 is hardened with the epoxy resin 32 to have an overall film thickness of 100 μm to 1 mm so as to be bonded to the insulation portion 3.

It is preferable for the epoxy resin 32 forming the cover film 3a of FIG. 2 to adjust a mixing ratio with respect to the powder 31 of thermoplastic resin, glass, cellulose, or polymer resin made of carbon and hydrogen, so that the epoxy resin 32 serves as a binder connecting the powder 31 and the insulation spacer 2.

The powder 31 has a particle size of 1 to 100 μm and the epoxy resin 32 is cured so as to maintain the particle size of the powder 31. A ratio by weight of the powder 31 and the epoxy resin 32 is adjusted so that the powder 31 accounts for a larger proportion than the epoxy resin 32.

The first embodiment is characterized in that the cover film 3a is formed on the insulation spacer 2 across the entire surface in contact with the insulation gas.

Incidentally, the cover film 3a is formed by a step of obtaining a mixed coating material by mixing the powder 31 of any of thermoplastic resin, glass, cellulose, and polymer resin made of carbon and hydrogen with the epoxy resin 32, and a step of obtaining the cover film 3a made of the powder 31 mixed in the epoxy resin 32 by applying the mixed coating material on the surface of the insulation spacer 2 followed by allowing the epoxy resin 32 to cure.

It should be noted that the cover film 3a is formed by allowing the epoxy resin 32 to cure without melting the powder 31 and thereby maintaining the powder 31 in the form of particles by heating the insulation spacer 2 on which is applied the mixed coating material at 100° C. or below.

A surface of the cured cover film 3a may be covered with a layer of the epoxy resin 32 in some cases. Hence, the epoxy resin 32 is scraped off the surface of the cover film 3a by means of blasting to let the powder 31 come out to an outermost layer of the cover film 3a.

FIG. 2 schematically shows a case where elongate metal foreign matter 7 having a length of about 3 mm or less and a radial thickness of about 0.2 mm or less adheres to the cover film 3a covering the insulation portion 3.

According to the configuration of the first embodiment, even when a voltage, such as lightning and a switching surge generated when the switchgear is in operation, is applied while the metal foreign matter 7 adheres to the cover film 3a, an insulation breakdown accident hardly occurs. It thus becomes possible to provide a highly-reliable gas insulated switchgear.

A function and an effect of this configuration will now be described in the following.

Firstly, influences of the metal foreign matter 7 present in the interior of the gas insulated switchgear will be described. As described above, the gas insulated switchgear is a unit including system breakers, disconnection switches, and ground switches and has a coaxial cylindrical structure in which the high-voltage conductor 5 supported on an insulation structural member, such as the insulation spacer 2, is housed inside the cylindrical ground tank 1. A space between the high-voltage conductor 5 and the ground tank 1 is filled with an insulation gas having high arc extinguishing performance and high insulation performance.

Most of parts forming the gas insulated switchgear are assembled in a clean room of a factory and shipped to a local site. However, apart of these parts are assembled at the local site due to transport limitation. Hence, there is a possibility that the metal foreign matter 7 comes inside the gas insulated switchgear during the assembly at the local site.

The metal foreign matter 7 can be a metal chip, such as burr left in a bolt through-hole when the ground tanks 1 are connected together. Apart from the burr, the metal foreign matter 7 may be generated when metals, such as the conductors, slide on each other in a switching portion. Most of the metal foreign matter 7 is removed in an inspection step. It is however, difficult to find the metal foreign matter 7 having a length of about 3 mm or less and a thickness of about 0.2 mm or less and such metal foreign matter 7 may slip past the inspection.

The metal foreign matter 7 lies down on the bottom surface in the interior of the ground tank 1 until an operation of the gas insulated switchgear starts. The metal foreign matter 7 starts to move when a voltage higher than a rated voltage is applied by a test before the operation starts. The metal foreign matter 7 then repeats reciprocal motion between the high-voltage conductor 5 supported on the insulation spacer 2 at the center of the ground tank 1 and the ground tank 1, and momentum of the reciprocal motion allows the metal foreign matter 7 to move about in the axial direction of the high-voltage conductor 5. In this instance, the metal foreign matter 7 may possibly adhere onto the surface of the insulation portion 3 of the insulation spacer 2 supporting the high-voltage conductor 5. When the metal foreign matter 7 adheres onto the surface, a triple junction is formed by three elements: the metal foreign matter 7, the insulation material, and the insulation gas. The triple junction is a region in which a high field is formed in comparison with the surrounding area due to a relation with a dielectric constant.

When a lightning waveform test voltage or a switching surge generated when the switchgear is in operation is applied while the metal foreign matter 7 adheres to the surface, discharge occurs because a field at the triple junction in the vicinity of the tip end of the metal foreign matter 7 where the field becomes particularly high readily exceeds a discharge field. In this instance, the field in a creepage direction on the surface of the insulation portion 3 of the insulation spacer 2 also becomes high. Hence, the discharge develops across the surface of the insulation portion 3 and bridges between the ground side and the conductor side, which gives rise to an insulation breakdown accident.

It is therefore crucial to suppress development of partial discharge generated at the triple junction triggered by adhesion of the metal foreign matter 7 onto the insulation spacer 2, and by so doing, a possibility of insulation breakdown can be lowered.

Generally, the surface of the insulation portion 3 of the insulation structural member, such as the insulation spacer 2, is finished smoothly (in the order of several μm). The idea underlying this finishing is the same as the one underlying a rise in the field on an irregular surface of a metal member. That is, because the field concentrates considerably due to irregularities of the insulation material, a similar countermeasure is taken herein. This countermeasure is taken on the assumption of an ideal case where the metal foreign matter 7 is absent. However, because the metal foreign matter 7 is present in an actual use environment as described above, relatively smooth finishing as above allows a triple junction to be form in the vicinity of the tip end of the metal foreign matter 7 at a high probability, and an insulation breakdown voltage drops as a result. This event will be described with reference to FIG. 3.

Figure 3:
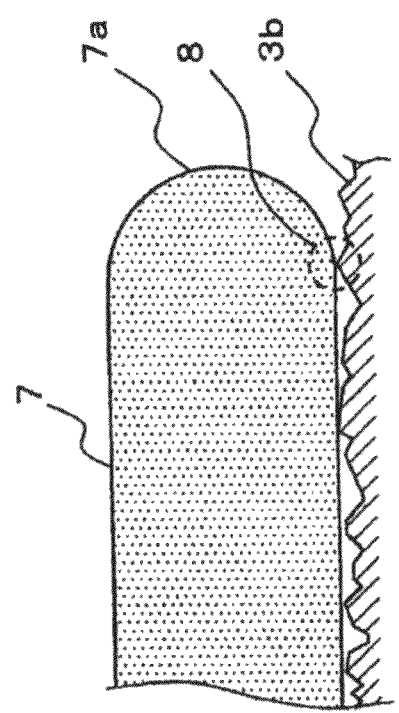
FIG. 3 is an enlarged cross section showing a state in which metal foreign matter adheres onto a surface of the insulation portion of the insulation spacer in a comparative example.

FIG. 3 is a schematic view showing a comparative example in which the metal foreign matter 7 adheres onto a surface (not covered with a cover film) 3b of the insulation portion of the insulation spacer finished relatively smoothly as in the related art. As can be understood from the drawing, in a case where the surface 3b of the insulation portion is smooth with a surface roughness Rz of less than 30 μm, as is enclosed by a broken line in the drawing, a triple junction 8 is formed in the vicinity of the metal foreign matter tip end 7a at a high probability.

The invention is configured to suppress development of partial discharge generated at the triple junction 8 at the metal foreign matter tip end 7a using ablation performance of powder by forming the cover film 3a from a layer of a mixture of powder made of any of ablation materials including thermoplastic resin, glass, cellulose, and polymer resin made of carbon and hydrogen, and epoxy resin on the surface of the insulation portion 3.

A function of the insulation spacer 2 of the invention will now be described.

Figure 4:
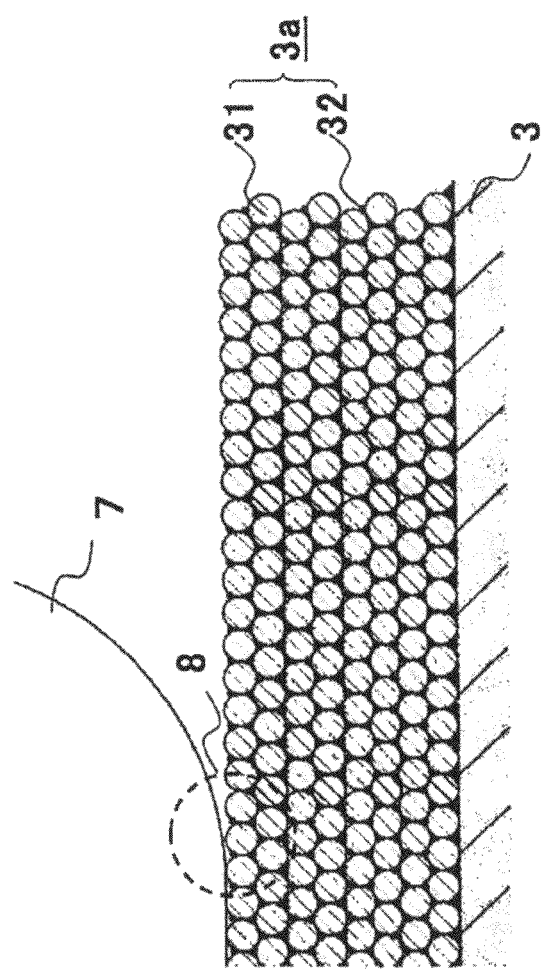
FIG. 4 is an enlarged cross section used to describe a state of metal foreign matter adhering onto the surface of the insulation portion of the insulation spacer of FIG. 1.

FIG. 4 is a partially enlarged cross section showing a state in which the metal foreign matter 7 adheres onto the cover film 3a covering the surface of the insulation portion 3 of the insulation spacer 2 in the first embodiment.

As is shown in the drawing, the powder 31 of any of thermoplastic resin, glass, cellulose, and polymer resin made of carbon and hydrogen, all of which are an ablation material, is hardened with a small amount of the epoxy resin 32 and particles of powder 31 are connected to one another. Hence, the powder 31 is heated by partial discharge generated in the vicinity of the triple junction 8 formed of the metal foreign matter 7, the layer surface of the powder 31, and the insulation gas. The powder 31 is thus heated, melted, evaporated, or cut and generates a gas. Accordingly, discharge energy is converted to energy of generation of the gas and development of partial discharge can be suppressed as a result. Hence, reliability of the insulation spacer 2 can be enhanced.

The effects described above were verified and confirmed by tests.

Figure 5:
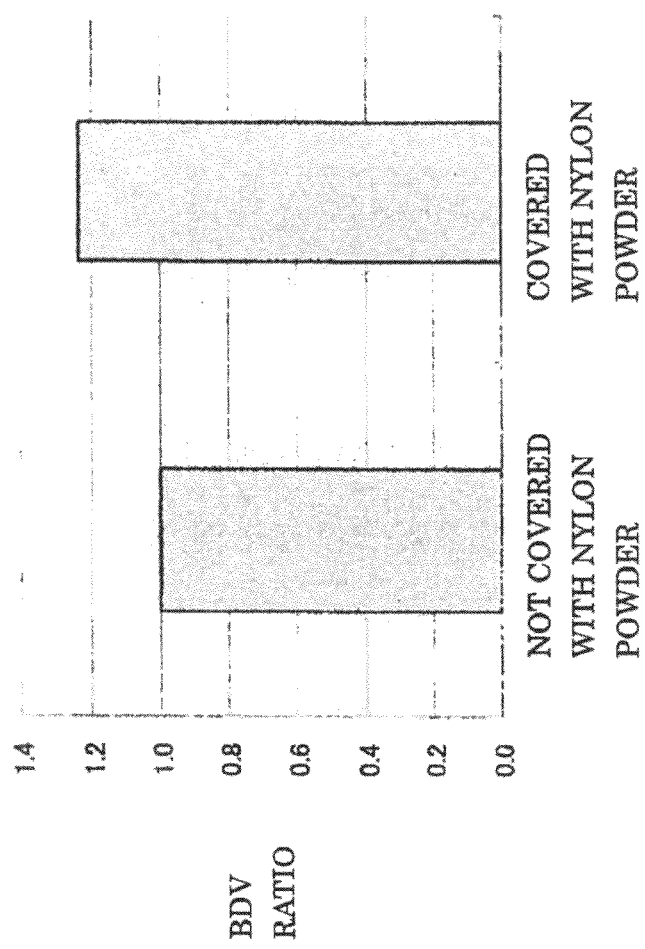
FIG. 5 is a view showing an insulation breakdown voltage in a case where metal foreign matter adheres to the insulation portion of the insulation spacer forming the gas insulated switchgear.

FIG. 5 is a view showing insulation breakdown voltages obtained as a result of a test in a case the fine metal foreign matter 7 as above adheres onto the surface of the insulation portion 3 when a layer of the powder 31 is formed on the surface of the insulation spacer 2 (covered with nylon powder) and when the surface is left intact (not covered with nylon powder). The ordinate indicates an insulation breakdown voltage (BDV ratio) and the abscissa indicates types.

As can be understood from FIG. 5, the BDV ratio is 1.0 in the absence of the cover film 3a whereas the BDV ratio rises as high as about 1.25 in the presence of the cover film 3a. Hence, the creepage breakdown voltage is increased by applying the coating of the invention on the surface.

A thickness of the cover film 3a in the test was about 500 μm. It is, however, preferable that a film thickness is about 1 mm in consideration of the effect that a field at the triple junction 8 is lowered by suppressing influences of a dielectric constant of the insulation spacer 2.

Figure 11:
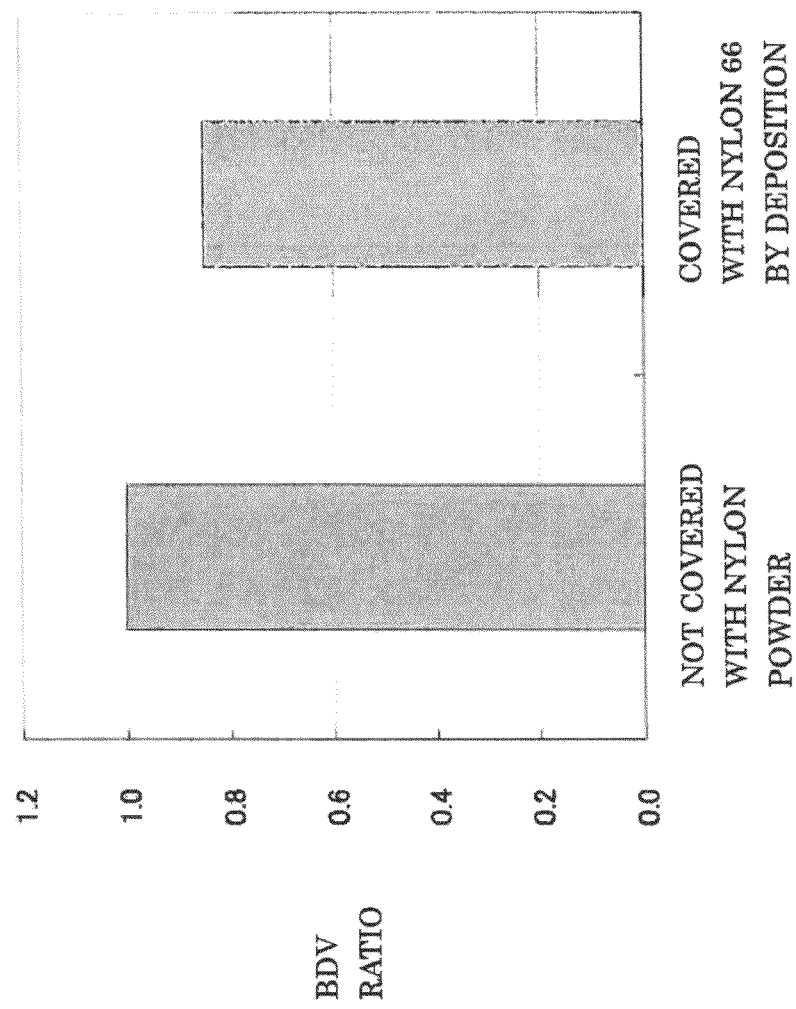
FIG. 11 is a view showing a result of a verification test by simulating an embodiment of PTL 1.
Figure 12:
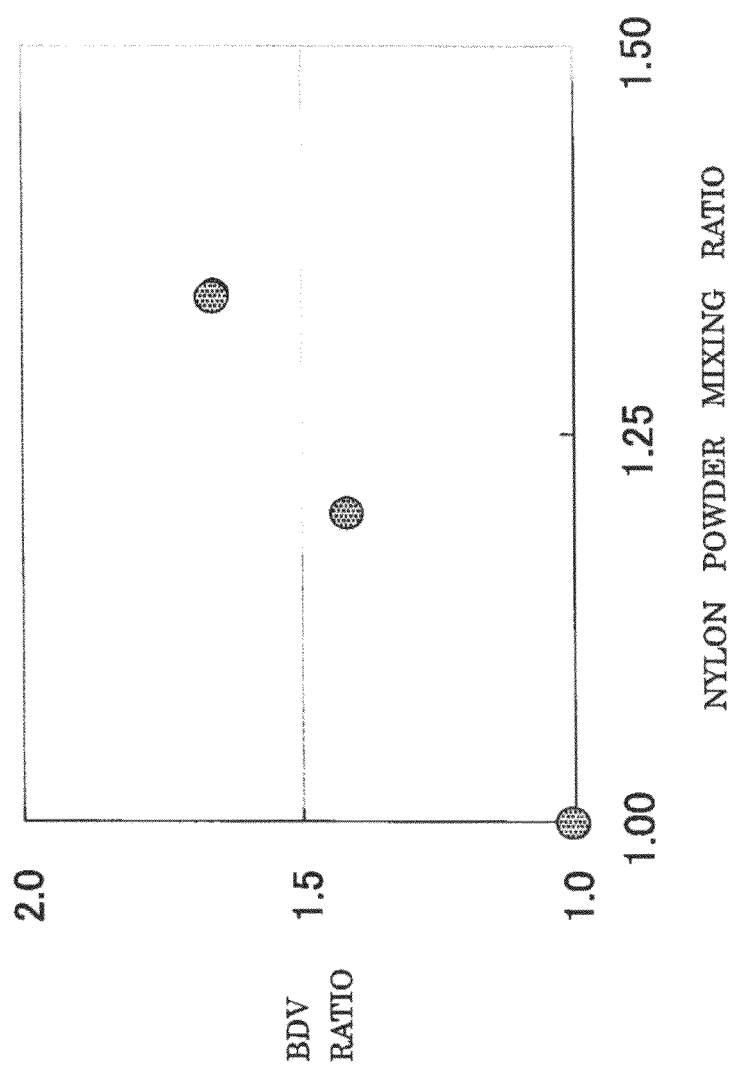
FIG. 12 is a view showing a result of a verification test of a withstand voltage by changing a filling amount of nylon covering the surface of the insulation spacer in the gas insulated switchgear of the invention.

PTL 1 describes that covering an insulation spacer creepage surface with thermoplastic resin provides a function of isolating discharge from the insulation spacer due to the ablation effect. Herein, a layer was formed by depositing nylon 66 (different from the configuration of the invention in which nylon powder comes out to the outermost layer of the cover film) on the creepage surface of the insulation spacer and a creepage withstand voltage when metal foreign matter adhered onto the surface was verified. Then, unlike the invention, the effect against metal foreign matter was not recognized as is shown in FIG. 11. In addition, regarding a ratio by weight in the cover film 3a made of the powder 31 and the epoxy resin 32, it is preferable that the powder 31 accounts for more than 50 percent of the total weight in order to melt, evaporate, or cut the powder 31 readily with micro discharge. FIG. 12 shows a graph of the verification result. In FIG. 12, the abscissa is used for a mixing ratio of nylon powder and the ordinate is used for a BDV ratio (withstand voltage). As is shown in FIG. 12, when a mixing ratio of nylon powder is in a range of 1.0 to 1.5, that is, when the nylon powder accounts for 50 to 60 percent of the total weight of the cover film 3a, the BDV ratio is as high as or higher than 1.0 and there is a tendency that a withstand voltage increases in the manner of a linear function with an increase of a ratio by weight of the nylon powder. It thus turns out that the withstand voltage rises when the power 31 accounts for more than 50 percent of the total weight.

The above has described that the insulation structural member supporting the high-voltage conductor 5 in the gas insulated switchgear is the insulation spacer 2 shaped like a conical surface as is shown in FIG. 1. It should be appreciated, however, that the insulation spacer 2 can be of various shapes and another example of the insulation spacer will be described in the following.

Figure 6A:
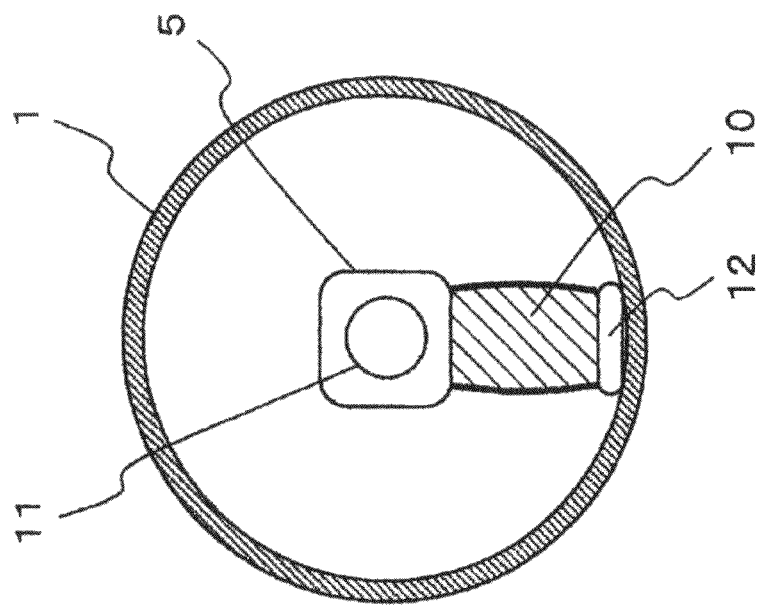
FIGS. 6A and 6B are cross sections showing another example of the insulation spacer in the gas insulated switchgear according to the first embodiment of the invention.
Figure 6B:
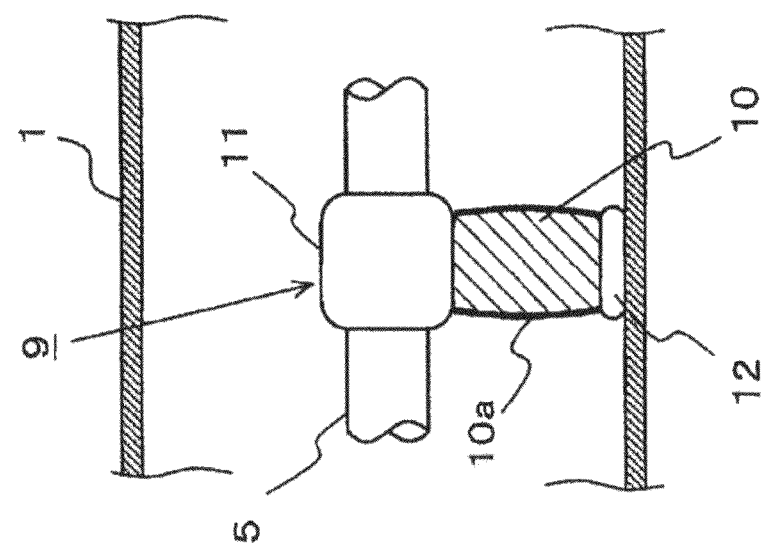

FIG. 6 is a view showing an insulation spacer 9 shaped like a mailbox. FIG. 6A is a side view and FIG. 6B is a front view when viewed from an axial direction of the ground tank 1. The mailbox-shaped insulation spacer 9 has an insulation portion 10 formed of an insulation member, a conductor support portion 11 supporting the high-voltage conductor 5 and also serving as a field limiting shield, and a fixing portion 12. The high-voltage conductor 5 is supported as the fixing portion 12 is fixed to a side wall of the ground tank 1. A surface portion of the insulation portion 10 in contact with the insulation gas is covered with a cover film 10a (indicated by a thick line in the drawing). As in the case of FIG. 2, the cover film 10a is formed of a layer made of the powder 31 of any of thermoplastic resin, glass, cellulose, and polymer resin made of carbon and hydrogen, and the epoxy resin 32.

Figure 7B:
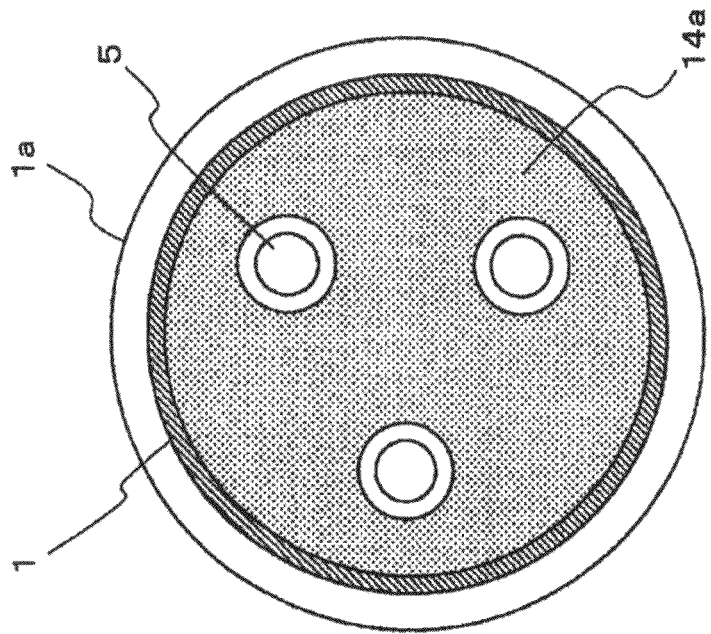
FIGS. 7A and 7B are cross sections showing still another example of the insulation spacer in the gas insulated switchgear according to the first embodiment of the invention.
Figure 7A:
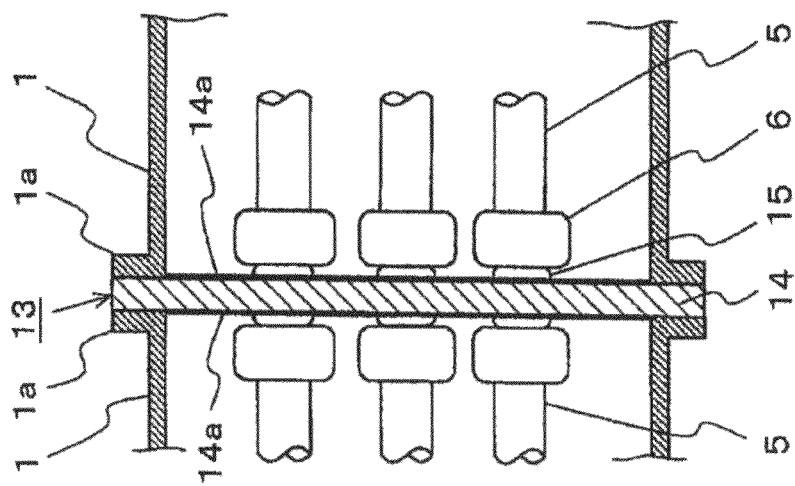

FIG. 7 shows a three-phase insulation spacer 13 shaped like a disc as still another example. FIG. 7A is a side view and FIG. 7B is a front view. Portions equivalent to those of FIG. 1 are labeled with the same reference numerals and a description is omitted herein. The insulation spacer 13 has an insulation portion 14 formed of an insulation member and center conductors 15 supporting respective high-voltage conductors 5. The high-voltage conductors 5 are connected to the both sides of the center conductor 15 and thereby supported thereon. Connection portions are covered with field limiting shields 6.

A cover film 14a (indicated by a thick line in the drawing) is formed on the insulation portion 14 across its surface portion in contact with the insulation gas. By forming the cover film 14a made of the powder 31 of thermoplastic resin, glass, cellulose, or polymer resin made of carbon and hydrogen, and the epoxy resin 32 in the same manner as in the case of FIG. 2 described above, a function and an effect same as those described above can be obtained.

It is not necessary to use a special material as an insulation material of the insulation spacers 9 and 13 and it is sufficient to use materials used in the related art, such as epoxy and epoxy and alumina, as described above with the insulation spacer 2. In other words, because a material of the insulation portion of the insulation spacer of this embodiment does not require a special material and insulation materials used often in the related art can be used. Hence, the insulation spacer can be formed at a lower cost.

In comparison with a case where a layer of thermoplastic resin having a high melting temperature is formed as in the related art, because it is not necessary for the cover film 3a (10a and 14a) of the invention to melt thermoplastic resin, a fabrication time can be shorten markedly and the manufacturing costs can be saved markedly as a result.

Further, the possibility that the film is ablated with micro discharge energy of partial discharge generated when the metal foreign matter 7 adheres onto the film is low for a film of thermoplastic resin as in the related art, and a creepage withstand voltage when the metal foreign matter adheres to the film is not enhanced. However, the configuration of the invention eliminates such concerns.

As has been described, according to the gas insulated switchgear of the first embodiment, a surface of the insulation portion 3 of the insulation spacer 2 in contact with the insulation gas is covered with the cover film 3a (10a and 14a) having a film thickness of 100 μm to 1 mm and made of the powder 31 of thermoplastic resin, glass, cellulose, or polymer resin made of carbon and hydrogen, and the epoxy resin 32. Hence, even in a case where the metal foreign matter 7 adheres onto the surface of the insulation portion 3 of the insulation spacer 2, the powder 31 is melted, evaporated, or cut with micro energy of partial discharge generated at the tip end of the metal foreign matter 7 where the field becomes the highest upon application of a voltage, such as lightning and a switching surge generated when the switchgear is in operation. Accordingly, the discharge energy is absorbed into the energy for the powder 31 and development of discharge can be suppressed. Hence, reliability of the gas insulated switchgear can be enhanced.

A composition of materials of the insulation portion 3 of the insulation spacer 2 is limited to any of epoxy, epoxy and alumina, epoxy and silica, and epoxy and alumina fluoride. It thus becomes possible to provide the insulation spacer 2 having the insulation portion 3 with a roughened surface at a lower cost using generally used insulation materials.

Second Embodiment

A gas insulated switchgear according to a second embodiment of the invention will now be described. Because a fundamental shape of the insulation spacer supporting the high-voltage conductor in the gas insulated switchgear is the same as those in FIG. 1, FIG. 6 and FIG. 7 of the first embodiment above, illustrations and a description of the configuration are omitted and a difference will be chiefly described herein. The difference is a range across which the cover film having ablation performance covers the surface of the insulation portion 3 of the insulation spacer 2.

Figure 8:
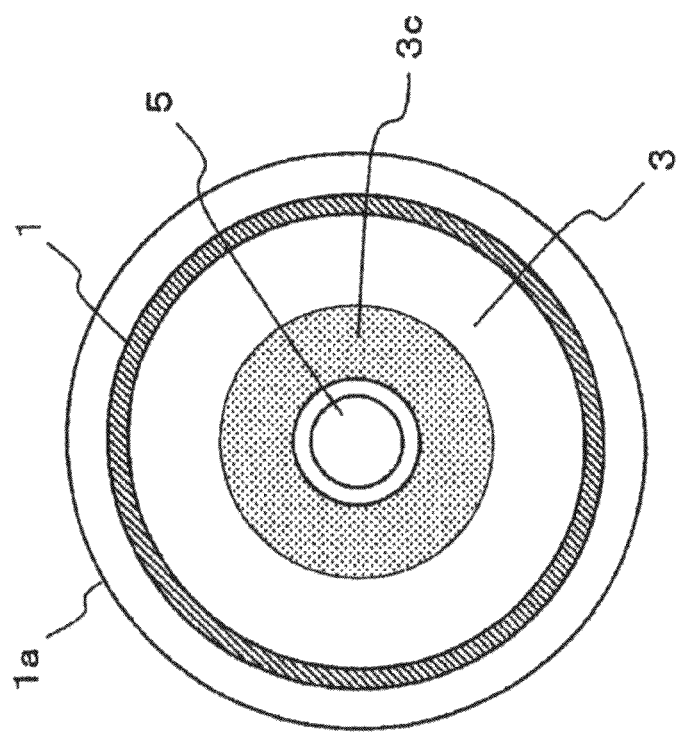
FIG. 8 is a front view showing a portion of an insulation spacer in a gas insulated switchgear according to a second embodiment of the invention.

FIG. 8 is a front view of a portion of an insulation spacer in the gas insulated switchgear of the second embodiment and this drawing corresponds to FIG. 1B of the first embodiment above.

In the first embodiment above, as is shown in FIG. 1, the cover film 3a (10a and 14a) is formed as a mixed layer obtained by mixing the powder 31 of any of thermoplastic resin, glass, cellulose, and polymer resin made of carbon and hydrogen with the epoxy resin 32 and covering the insulation portion 3 forming the insulation spacer 2 across the entire surface thereof in contact with the insulation gas. In contrast, in the second embodiment, as is shown in FIG. 8, a cover range of the surface of the insulation portion 3 as the surface forming the insulation spacer 2 and in contact with the insulation gas is defined to be a range from a supported side of the high-voltage conductor 5 toward a fixed side to the ground tank 1 and about 50% (on the both surfaces) from the supported side, and a cover film 3c made of the powder 31 of any of thermoplastic resin, glass, cellulose, and polymer resin made of carbon and hydrogen, and the epoxy resin 32 of the configuration same as the one shown in FIG. 2 described in the first embodiment above is formed so as to cover the cover range defined as above.

In the second embodiment, the cover film 3c is formed in a rage having a predetermined expansion from a center portion of the insulation portion 3 of the insulation spacer 2 in which the high-voltage conductor 5 is held. For example, as is shown in FIG. 8, the second embodiment is characterized in that the insulation spacer 2 is shaped like a conical surface provided from the center portion to the inner surface of the ground tank 1 and covered with the cover film 3c in a range from the vicinity of the apex of the conical surface to substantially half the height.

A function of the gas insulated switchgear having the cover film 3c shown in FIG. 8 will now be described.

Generally, in the insulation spacer 2, the field becomes particularly high on the surface of the insulation spacer 2 close to the field limiting shield 6 attached to the high-voltage conductor 5 and creepage discharge is generated more often particularly in a case where the metal foreign matter 7 adheres to the surface.

Figure 9:
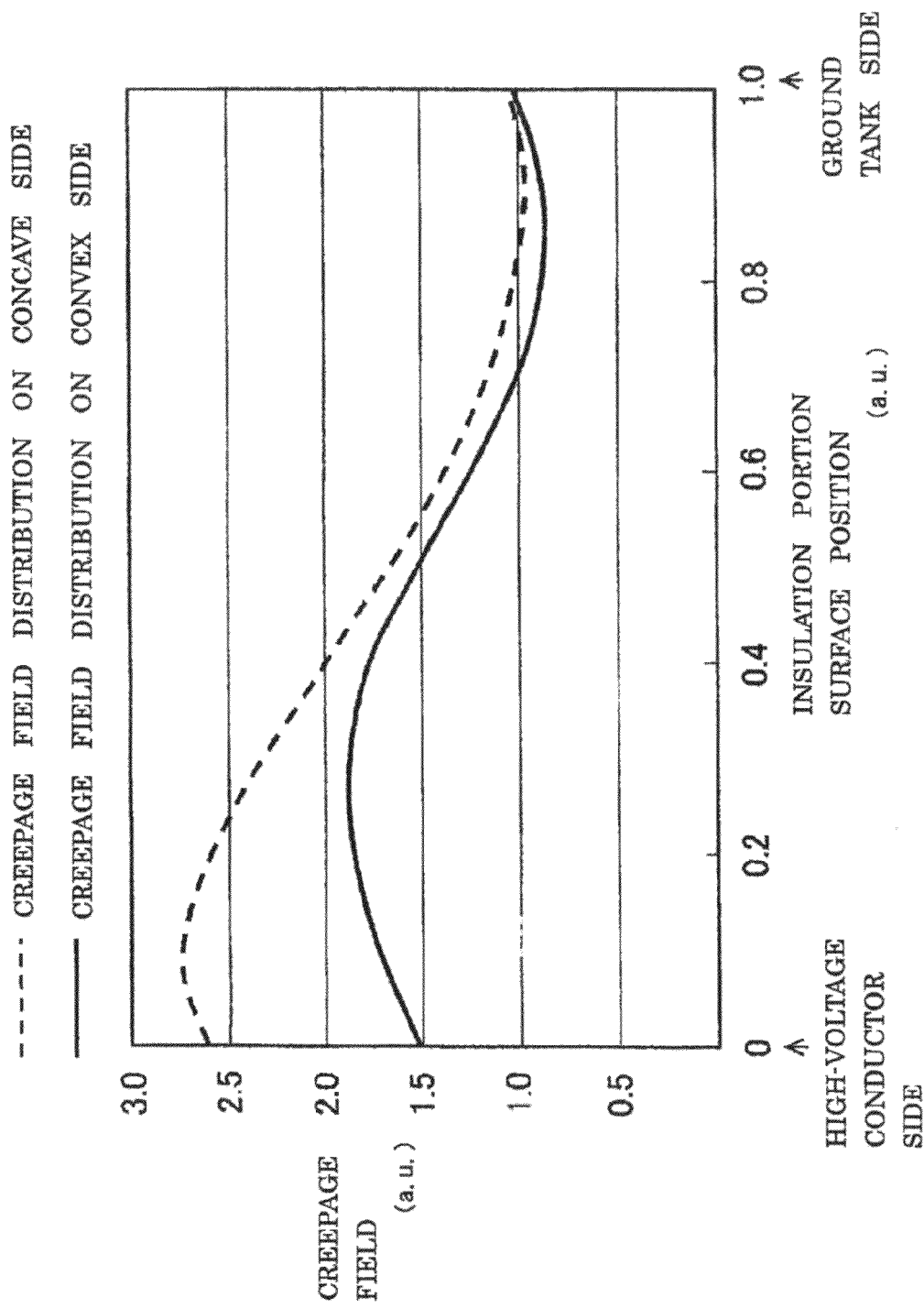
FIG. 9 is a view showing a field distribution across a surface of an insulation portion of the insulation spacer in the gas insulated switchgear according to the second embodiment of the invention.

FIG. 9 shows a field distribution view in the creepage direction on the surface of the insulation portion 3 in a case where the insulation spacer 2 is shaped like a conical surface as shown in FIG. 1. In FIG. 9, a broken line indicates a creepage field distribution on a concave side and a solid line indicates a creepage field distribution on a convex side. It is understood from FIG. 9 that the field distributions on the both surfaces of the insulation spacer 2 have a maximum field in a region where a distance from the side of the high-voltage conductor 5 is 50% or less.

Because the cover film 3c selectively covers the center portion of the insulation spacer 2 in the second embodiment, a dielectric strength on the surface of the insulation spacer 2 can be enhanced efficiently.

Regarding a shape of the insulation spacer, even in the case of the insulation spacer 9 shaped like a mailbox as shown in FIG. 6 and the insulation spacer 13 shaped like a disc as shown in FIG. 7, the insulation spacer can be covered in a range of about 50% from the side closer to the high-voltage conductor 5 from the supported side of the high-voltage conductor 5 toward the fixed side to the ground tank 1.

As has been described above, according to the gas insulated switchgear of the second embodiment, the surface of the insulation portion 3 of the insulation spacer 2 in contact with the insulation gas is covered in a range of about 50% from the supported side from the supported side of the high-voltage conductor 5 toward the fixed side fixed to the ground tank 1. Hence, even when the metal foreign matter 7 adheres onto the surface of the insulation spacer 2 at a position at which the field becomes highest, the insulation performance is not deteriorated. Further, in comparison with a case where the entire surface of the insulation spacer 2 is covered, a processing work time can be shorten and the manufacturing can be more efficient.

Third Embodiment

A third embodiment relates to a forming method of the cover film 3a (10a and 14a) formed on the insulation portion surface of the insulation spacer in a gas insulated switchgear equivalent to the counterpart described in the first or second embodiment. Because the configuration of the gas insulated switchgear is the same as those shown in FIG. 1, FIG. 6, and FIG. 7, illustrations and a description are omitted herein.

As has been described, the cover film 3a (10a and 14a) is formed by a step of obtaining a mixed coating material by mixing the powder 31 made of an ablation material with the epoxy resin 32, and a step of obtaining the cover film 3a made of the powder 31 mixed in the epoxy resin 32 by applying the mixed coating material on the surface of the insulation spacer 2 followed by allowing the epoxy resin 32 to cure, and the powder 31 remains in the form of particles after the cover film 3a is formed.

A first forming method of the cover film 3a will now be described. Herein, a mixed coating material is prepared by mixing any of thermoplastic resin, glass, cellulose, and polymer resin made of carbon and hydrogen as the powder 31 made of solid particles of an ablation material with the epoxy resin 32 made of liquid base resin and a liquid curing agent, and this mixed coating material is sprayed onto the surface of the insulation portion 3 (10 and 14). Thereafter, the epoxy resin 32 alone is cured in a hardening furnace, so that the surface of the insulation portion 3 of the insulation spacer 2 is covered while the powder 31 maintains a particle size without being melted. In this instance, by using epoxy resin that cures at normal temperature or low temperature (from normal temperature up to 100° C.), it becomes unnecessary to adjust a temperature of the insulation spacer 2 serving as abase layer and unnecessary heating can be suppressed.

Another forming method of the cover film 3a will now be described.

Any of thermoplastic resin, glass, cellulose, and polymer resin made of carbon and hydrogen as the powder 31, and base resin (solid particles) and a curing agent (solid particles)

of the epoxy resin 32 are sprayed onto the surface of the insulation portion 3 in the form of a mixture or independently at the same time. Thereafter, the epoxy resin 32 alone is cured in a hardening furnace so that the surface of the insulation portion 3 of the insulation spacer 2 is covered while the unmelted powder 31 maintains a particle size. In this instance, for example, the epoxy resin 32 that cures at normal temperature or low temperature (from normal temperature up to 100° C.) is used.

As still another forming method will now be described. Herein, a liquid of the epoxy resin 32 prepared by mixing base resin with a curing agent is sprayed onto the surface of the insulation portion 3 of the insulation spacer 2 or applied thereon using a brush. Subsequently, any of thermoplastic resin, glass, cellulose, and the polymer resin made of carbon and hydrogen as the powder 31 made of solid particles of an ablation material is sprayed onto the surface. Thereafter, the epoxy resin 32 alone is cured in a hardening furnace so that the surface of the insulation portion 3 of the insulation spacer 2 is covered with the cover film 3a while the unmelted powder 31 maintains a particle size. In this instance, for example, the epoxy resin 32 that cures at normal temperature or low temperature (from normal temperature up to 100° C.) is used.

According to the methods as above, it becomes possible to let the powder 31 made of an ablation material adhere onto the surface of the insulation portion 3 of the insulation spacer 2 while remaining in the form of particles, so that partial discharge generated at the tip end of the metal foreign matter 7 as a generation starting point can be suppressed in a reliable manner.

Also, by using the epoxy resin 32 that cures at normal temperature or low temperature, the need to use a high-temperature hardening furnace can be eliminated. Hence, energy consumption can be reduced and the work period can be shorter. The insulation spacer 2 with an enhanced dielectric strength can be thus manufactured extremely easily.

It is preferable to roughen the surface of the insulation portion 3 of the insulation spacer 2 by means of shot blast in advance before application of the powder 31 of any of thermoplastic resin, glass, cellulose, and polymer resin made of carbon and hydrogen, and the epoxy resin 32.

The epoxy resin as a material of the insulation spacer 2 and the epoxy resin used for fixation of thermoplastic resin, glass, cellulose, or polymer resin made of carbon and hydrogen have good affinity. However, an interface where the two insulators are connected can be electrical and mechanical drawbacks. Such electrical and mechanical defects can be prevented by forming a layer (cover film 3a) of any of thermoplastic resin, glass, cellulose, and the polymer resin made of carbon and hydrogen, and epoxy resin on the surface roughened by means of shot blast.

Because the cover film 3a is formed on the surface of the insulation portion 3, a surface area of which is increased by roughening by means of shot blast. Hence, a surface of the powder 31 coming out to the cover film 3a can be increased.

Figure 10:
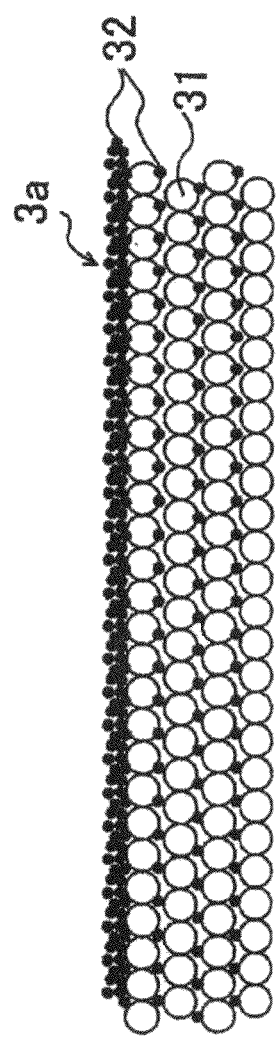
FIG. 10 is a sectional view showing a configuration before blasting of a cover film covering a surface of an insulation spacer in a gas insulated switchgear according to a third embodiment of the invention.

The outermost layer of the cover film 3a is considered as follows. That is, a typical insulation spacer 2 is formed of epoxy resin using alumina and silica as a filling material and the outermost layer is covered with a dozens-μm-thick layer of epoxy resin alone. Likewise, in a case where a mixture of the powder 31 made of an ablation material and the epoxy resin 32 is applied as in the invention, as is shown in FIG. 10, a layer of the epoxy resin 32 alone is generated in the outermost layer in some cases. In a case where the epoxy resin 32 covers the outermost layer of the cover film 3a, even when the metal foreign matter 7 adheres to the surface and partial discharge is generated at the foreign matter tip end, it cannot be thought that the layer of the epoxy resin 32 melts or scatters by discharge energy. It is therefore necessary to adjust a mixing ratio of the powder 31 and the epoxy resin 32 so that the powder 31 comes out to the surface as much as possible. Because a heat capacity of the powder 31 is small, a possibility that the powder 31 melts with discharge at the tip end of the metal foreign matter can be increased by letting the powder 31 come out to the surface. Also, it is thought that adhesion strength of the epoxy resin 32 is reduced by letting the powder 31 come out to the surface of the cover film 3a, and a possibility that the powder 31 scatters with partial discharge can be increased, too. By roughening the surface layer made of the powder 31 and the epoxy resin 32 by means of shot blast in order to increase these possibilities, the powder 31 naturally comes out to the surface at a higher possibility. Hence, the powder 31 melts and scatters with partial discharge more readily and a withstand voltage can be higher as a result.

As has been described above, according to the manufacturing method of a gas insulated switchgear of the third embodiment, the surface of the insulation portion 3 of the insulation spacer 2 in contact with the insulation gas is covered with the cover film 3a having a film thickness of 100 μm to 1 mm, that is, with the powder 31 of any of thermoplastic resin, glass, cellulose, and polymer resin made of carbon and hydrogen, and the epoxy resin 32. Hence, even in a case where the metal foreign matter 7 adheres onto the surface of the insulation portion 3 of the insulation spacer 2, the powder 31 made of an ablation material is melted, evaporated, or cut with micro energy of partial discharge generated at the tip end of the metal foreign matter 7 where the field becomes the highest upon application of a voltage, such as lightning and a switching surge generated when the switchgear is in operation. Accordingly, discharge energy is absorbed into the energy for the powder 31 and development of discharge can be suppressed. Hence, reliability of the gas insulated switchgear can be enhanced.

It should be understood that the respective embodiments can be combined without any restriction and the respective embodiments can be modified or omitted as the need arises within the scope of the invention.

The invention claimed is:

1. A gas insulated switchgear comprising:
   a ground tank filled with an insulation gas;
   a high-voltage conductor installed in a center portion inside the ground tank; and
   an insulation spacer installed inside the ground tank and supporting the high-voltage conductor, the insulation spacer including an insulation portion made of an insulation material and a center conductor,
   wherein a surface of the insulation portion is covered with a powder layer, the powder layer including a mixture of powder particles made of an ablation material and an epoxy resin, and
   the mixture of powder particles is exposed to an outermost layer of the powder layer wherein the powder layer maintains a powder particle characteristic of the ablation material.

2. The gas insulated switchgear according to claim 1, wherein the powder particles are made of thermoplastic resin.

3. The gas insulated switchgear according to claim 1, wherein the powder particles are made of glass.

4. The gas insulated switchgear according to claim 1, wherein the powder particles are made of cellulose resin.

5. The gas insulated switchgear according to claim 1, wherein the powder particles are made of polymer resin containing carbon and hydrogen.

6. The gas insulated switchgear according to claim 1,
wherein the powder particles have a particle size of 1 to 100 µm; and
the epoxy resin is cured so as to maintain the particle size of the powder.

7. The gas insulated switchgear according to claim 1,
wherein a chief component of the insulation portion is formed of any of epoxy, epoxy and alumina, epoxy and silica, and epoxy and alumina fluoride.

8. The gas insulated switchgear according to claim 1,
wherein a ratio by weight of the powder particles and the epoxy resin of the powder layer is set so that the powder particles accounts for a larger proportion than the epoxy resin.

9. The gas insulated switchgear according to claim 1,
wherein the powder layer is formed on the insulation portion across an entire surface thereof in contact with the insulation gas.

10. The gas insulated switchgear according to claim 1,
wherein the powder layer is formed on the insulation portion in a coverage range having a predetermined expansion from the center portion in which the high-voltage conductor is held.

11. The gas insulated switchgear according to claim 10,
wherein the insulation portion is shaped like a conical surface provided from the center portion to an inner surface of the ground tank; and
the coverage range is defined by a range from a vicinity of an apex of the conical surface to substantially half a height is covered with the powder layer.

12. A manufacturing method of a gas insulated switchgear including a high-voltage conductor supported on an insulation spacer and installed inside a ground tank filled with an insulation gas, wherein the insulation spacer includes an insulation portion made of an insulation material and a center conductor, the manufacturing method comprising:

obtaining a mixed coating material by mixing powder particles of any of thermoplastic resin, glass, cellulose, and polymer resin containing carbon and hydrogen with epoxy resin;

obtaining a powder layer made of a mixture of the powder particles and the epoxy resin by applying the mixed coating material on a surface of the insulation portion followed by allowing the epoxy resin to cure; and scraping the epoxy resin off of a surface of the powder layer by applying blasting to the powder layer to expose the powder particles to an outermost layer of the powder layer, wherein the powder layer maintains a powder particle characteristic of an ablation material.

13. The manufacturing method of a gas insulated switchgear according to claim 12,
wherein in the powder layer obtaining, the epoxy resin is cured without melting the powder by heating the insulation portion on which the mixed coating material is applied at 100° C. or below.

* * * * *